United States Patent
Lam (10) Patent No.: US 8,880,652 B2
(45) Date of Patent: Nov. 4, 2014

(54) HEURISTIC BROWSER PREDICTIVE PRE-CACHING

(75) Inventor: Yin Zin Mark Lam, Milpitas, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 632 days.

(21) Appl. No.: 13/232,838

(22) Filed: Sep. 14, 2011

(65) Prior Publication Data

US 2013/0067170 A1    Mar. 14, 2013

(51) Int. Cl.
*G06F 15/16*    (2006.01)
*G06F 12/08*    (2006.01)
*G06F 13/00*    (2006.01)

(52) U.S. Cl.
CPC ...................... *G06F 12/08* (2013.01)
USPC ........... 709/219; 709/217; 711/118; 711/133; 711/135; 711/136; 711/137

(58) Field of Classification Search
CPC ............ H04L 67/2852; H04L 67/2847; G06F 17/30902
USPC .......... 711/118, 133, 135, 136, 137; 709/217, 709/219
See application file for complete search history.

(56) References Cited

U.S. PATENT DOCUMENTS

| | | | |
|---|---|---|---|
| 5,442,771 A † | 8/1995 | Filepp | |
| 6,128,701 A † | 10/2000 | Malcolm | |
| 2003/0084250 A1* | 5/2003 | Gaither et al. | 711/133 |
| 2006/0069746 A1* | 3/2006 | Davis et al. | 709/218 |
| 2009/0132718 A1* | 5/2009 | Groll et al. | 709/229 |
| 2009/0221307 A1* | 9/2009 | Wolak et al. | 455/466 |
| 2011/0035399 A1* | 2/2011 | Deng et al. | 707/768 |
| 2011/0131341 A1* | 6/2011 | Yoo et al. | 709/237 |
| 2011/0264731 A1* | 10/2011 | Knowles et al. | 709/203 |
| 2013/0031197 A1* | 1/2013 | Reyes et al. | 709/213 |

\* cited by examiner
† cited by third party

*Primary Examiner* — Hong Kim (57) ABSTRACT

A method and computer readable medium are disclosed for predictive caching of web pages for display through a screen of a mobile computing device. A load request is received at a mobile computing device, where the load request includes a current timestamp and an address. The address points to a remote server storing a current copy of the address content. The mobile computing device determines whether there is an existing copy of the address content is pre-cached on the mobile computing device. The mobile computing device determines whether a difference between the current timestamp and a pre-cache timestamp is greater than a heuristic timeliness value. If it is, the mobile computing device pre-caches the current copy of the address content from the remove server at the address on the mobile computing device. The mobile computing device then provides the current copy of the address content for display on its screen.

15 Claims, 6 Drawing Sheets

HEURISTIC BROWSER PREDICTIVE PRE-CACHING

BACKGROUND

1. Field of Art

The disclosure generally relates to the field of mobile browsers, and more specifically to mobile browser content download management.

2. Description of Art

Mobile computing devices, for example, smartphones and functionality enhanced mobile phones, are well known. Such computing devices include screens that display network and application user interfaces, for example, web browsers or applets. These devices may need to download a large volume of timely and relevant information to be rendered in these web browsers or applets for user consumption.

One problem with mobile computing devices is that they frequently have limited network availability. Network availability may be limited in the sense that a network connection may be intermittent, or the available bandwidth or speed of the network may be low. Hence, devices may be unable to download and render requested information for the user in a timely manner. Yet another problem is that depending on the type and strength of network availability, power consumption in order to accomplish a download task will vary.

One attempt to address the shortcomings of the art has been to implement new network technologies that provide a faster connection with which to transfer the needed data. However, it may not always be feasible to upgrade network infrastructure to improve downloading speed everywhere the device may be used. Further, upgraded network infrastructure for mobile computing devices frequently lags behind the rate at which mobile device software services are able use up that network availability.

Other approaches involve improving mobile device hardware or optimizing browser software in order to render the downloaded page at the fastest possible speed, however neither of these approaches addresses underlying network bottleneck issues that are the main source of the problem. Another approach has been to render an outdated version of a webpage in cache and to present it to the user while the latest page is being downloaded, however since the page is out of date, the user may be presented with inaccurate information.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will be made in detail to several embodiments, examples of which are illustrated in the accompanying figures. It is noted that wherever practicable, similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

General Example Overview

One embodiment of a disclosed system (or apparatus or method or computer readable storage medium) is configured for browser predictive caching based on address (commonly URI) request patterns and contextual information in order to make predictions of when the user will wish to view the content (i.e., address content) of certain web pages. In one embodiment a load request for a particular address of a web page or other remote server is detected, where the load request includes a current timestamp. For example, the load request may consist of a HTTP GET request to retrieve the content of a web page being accessed through an internet browser. In another example, the load request consists of an application-based socket or port information request such as a SOAP, XML, or RTST request. A request database will be queried for a record that corresponds to the requested address and a timestamp in proximity of the current timestamp. If such a record does not already exist, one will be created and inserted into the database. The record will contain values representing the requested address, a timestamp, an access count, and a heuristic timeliness value. The first time the address is requested, the record timestamp shall be set to the current timestamp, the access count shall be set to an appropriate initial value e.g. zero or one, and the heuristic timeliness value will be set to an appropriate initial range value e.g 15 minutes. In response to this first request, the address content of the web page at the requested address will be downloaded and provided for display on the screen.

For each subsequent request of the same address at the same approximate time (detected by the availability of a relevant record in the request database), the access count in the relevant request record is incremented. It is determined whether the access count meets or exceeds a caching threshold. Responsive to determining that the access count meets or exceeds the caching threshold, it is determined whether the address content shall be scheduled for pre-caching at a later pre-cache time. At the later scheduled pre-cache time, the address content will be downloaded into a data cache and the timestamp of the download (download time) will be recorded along with the address content in the data cache.

Responsive to the request for an address at a certain time, the data cache will be checked for the availability of content from the requested address, and a matching request record, if available, will be fetched from the request database. If a copy of the address content is available in the data cache, it is determined whether the heuristic timeliness value in the request record is greater than a difference of the current timestamp and the recorded download time of the cached address content. If the heuristic timeliness value is not greater than the difference, then the cached address content is considered to be untimely, and a new copy of the address content is then downloaded and cached in the data cache, and its download time is updated accordingly. The cached address content is then provided for display on the screen.

Example Mobile Computing Device

Figure 1A:
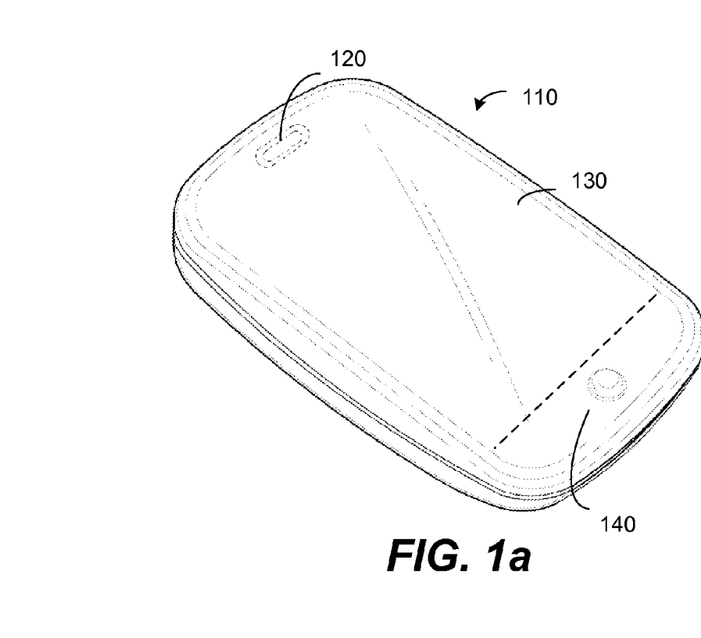
FIG. 1a illustrates one example embodiment of a mobile computing device in a first positional state.
Figure 1B:
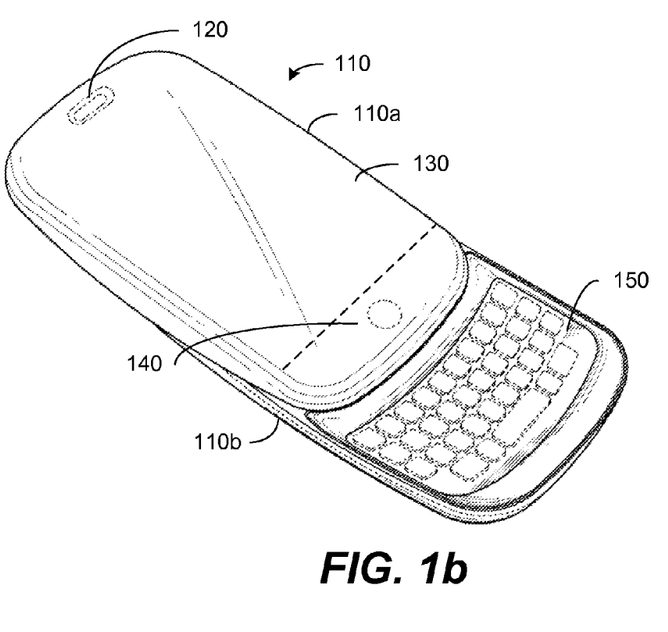
FIG. 1b illustrates one example embodiment of the mobile computing device in a second positional state.

In one example embodiment, the configuration as disclosed may be configured for use with any computing device for example, a laptop computer, a desktop computer, a notebook computer, a netbook computer, a smartphone, a media player, or tablet computer which operates over a mobile telecommunications network. For ease of discussion, the embodiments disclosed will be described in the context of a mobile computing device, but would be applicable to other computing devices. FIGS. 1a and 1b illustrate one embodiment of a mobile computing device 110. Figure (FIG.) 1a illustrates one embodiment of a first positional state of the mobile computing device 110 having telephonic functionality, e.g., a mobile phone or smartphone. FIG. 1b illustrates one embodiment of a second positional state of the mobile computing device 110 having telephonic functionality, e.g., a mobile phone, smartphone, netbook computer, a notebook computer, a tablet computer, a desktop computer, or laptop computer. The mobile computing device 110 is configured to host and execute a phone application for placing and receiving telephone calls.

It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with public switched telephone networks (PSTN) and/or data networks having voice over internet protocol (VoIP) functionality. Likewise, the mobile computing device 110 is only by way of example, and the principles of its functionality apply to other computing devices, e.g., tablet computers, a notebook computer, a netbook computer, desktop computers, media players, and the like.

The mobile computing device 110 includes a first portion 110a and a second portion 110b. The first portion 110a comprises a screen for display of information (or data) and may include navigational mechanisms. These aspects of the first portion 110a are further described below. The second portion 110b comprises a keyboard and also is further described below. The first positional state of the mobile computing device 110 may be referred to as an "open" position, in which the first portion 110a of the mobile computing device slides in a first direction exposing the second portion 110b of the mobile computing device 110 (or vice versa in terms of movement). The mobile computing device 110 remains operational in either the first positional state or the second positional state.

The mobile computing device 110 is configured to be of a form factor that is convenient to hold in a user's hand, for example, a personal digital assistant (PDA) or a smart phone form factor. For example, the mobile computing device 110 can have dimensions ranging from 7.5 to 15.5 centimeters in length, 5 to 15 centimeters in width, 0.5 to 2.5 centimeters in thickness and weigh between 50 and 250 grams.

The mobile computing device 110 includes a speaker 120, a screen 130, and an optional navigation area 140 as shown in the first positional state. The mobile computing device 110 also includes a keypad 150, which is exposed in the second positional state. The mobile computing device also includes a microphone (not shown). The mobile computing device 110 also may include one or more switches (not shown). The one or more switches may be buttons, sliders, or rocker switches and can be mechanical or solid state (e.g., touch sensitive solid state switch).

The screen 130 of the mobile computing device 110 is, for example, a 240×240, a 320×320, a 320×480, or a 640×480 touch sensitive (including gestures) display screen. The screen 130 can be structured from, for example, such as glass, plastic, thin-film or composite material. The touch sensitive screen may be a transflective liquid crystal display (LCD) screen. In alternative embodiments, the aspect ratios and resolution may be different without departing from the principles of the inventive features disclosed within the description. By way of example, embodiments of the screen 130 comprises an active matrix liquid crystal display (AMLCD), a thin-film transistor liquid crystal display (TFT-LCD), an organic light emitting diode (OLED), an interferometric modulator display (IMOD), a liquid crystal display (LCD), or other suitable screen device. In an embodiment, the screen displays color images. In another embodiment, the screen 130 further comprises a touch-sensitive screen (e.g., pressure-sensitive (resistive), electrically sensitive (capacitive), acoustically sensitive (SAW or surface acoustic wave), photo-sensitive (infra-red)) including a digitizer for receiving input data, commands or information from a user. The user may use a stylus, a finger or another suitable input device for data entry, such as selecting from a menu or entering text data.

The optional navigation area 140 is configured to control functions of an application executing in the mobile computing device 110 and visible through the screen 130. For example, the navigation area includes an x-way (x is a numerical integer, e.g., 5) navigation ring that provides cursor control, selection, and similar functionality. In addition, the navigation area may include selection buttons to select functions displayed through a user interface on the screen 130. In addition, the navigation area also may include dedicated function buttons for functions such as, for example, a calendar, a web browser, an e-mail client or a home screen. In this example, the navigation ring may be implemented through mechanical, solid state switches, dials, or a combination thereof. In an alternate embodiment, the navigation area 140 may be configured as a dedicated gesture area, which allows for gesture interaction and control of functions and operations shown through a user interface displayed on the screen 130.

The keypad area 150 may be a numeric keypad (e.g., a dialpad) or a numeric keypad integrated with an alpha or alphanumeric keypad or character keypad 150 (e.g., a keyboard with consecutive keys of Q-W-E-R-T-Y, A-Z-E-R-T-Y, or other equivalent set of keys on a keyboard such as a DVORAK keyboard or a double-byte character keyboard).

Although not illustrated, it is noted that the mobile computing device 110 also may include an expansion slot. The expansion slot is configured to receive and support expansion cards (or media cards). Examples of memory or media card form factors include COMPACTFLASH, SD CARD, XD CARD, MEMORY STICK, MULTIMEDIA CARD, SDIO, and the like.

Example Mobile Computing Device Architectural Overview

Figure 2:
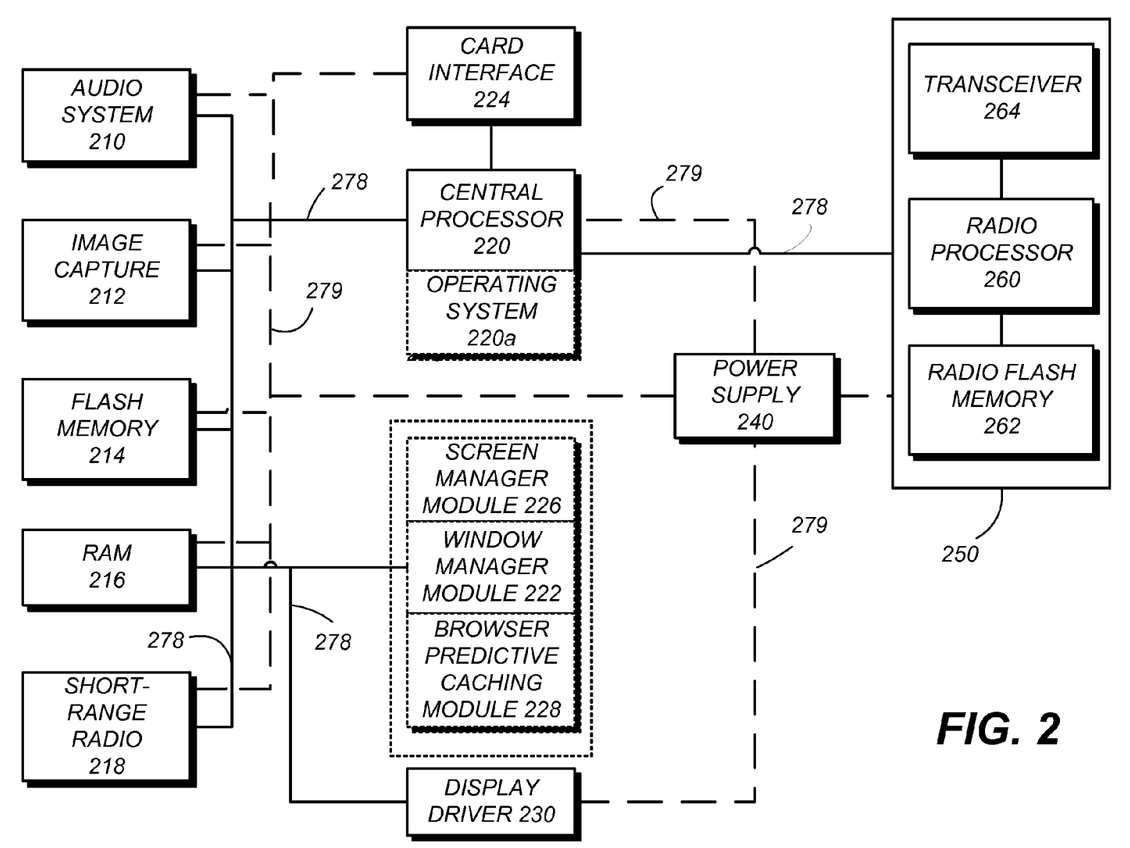
FIG. 2 illustrates one example embodiment of an architecture of a mobile computing device.

Referring next to FIG. 2, a block diagram illustrates one embodiment of an architecture of a mobile computing device 110, with telephonic functionality. By way of example, the architecture illustrated in FIG. 2 will be described with respect to the mobile computing device of FIGS. 1a and 1b. The mobile computing device 110 includes one or more processors (a processor system or a central processing system or for each of discussion a central processor 220), a power supply 240, and a radio subsystem 250. Examples of a central processor 220 include processing chips and system based on architectures such as ARM (including cores made by microprocessor manufacturers), ARM XSCALE, AMD ATHLON, SEMPRON or PHENOM, INTEL ATOM, XSCALE, CELERON, CORE, PENTIUM or ITANIUM, IBM CELL, POWER ARCHITECTURE, SUN SPARC and the like.

The central processor 220 is configured for operation with a computer operating system 220a. The operating system 220a is an interface between hardware and an application, with which a user typically interfaces. The operating system is responsible for the management and coordination of activities and the sharing of resources of the mobile computing device 110. The operating system provides a host environment for applications that are run on the mobile computing device 110. As a host, one of the purposes of an operating system 220a is to handle the details of the operation of the mobile computing device 110. Examples of an operating system 220a include PALM OS and WEBOS, MICROSOFT WINDOWS (including WINDOWS 7, WINDOWS CE, WINDOWS MOBILE, and WINDOWS PHONE 7), SYMBIAN OS, RIM BLACKBERRY OS, APPLE OS (including MAC OS and IPHONE OS), GOOGLE ANDROID, and LINUX.

The central processor 220 communicates with an audio system 210, an image capture subsystem (e.g., camera, video or scanner) 212, flash memory 214, RAM memory 216, and a short range radio module 218 (e.g., Bluetooth, Wireless Fidelity (WiFi) component (e.g., IEEE 802.11)). The central processor 220 communicatively couples these various components or modules through a data line (or bus) 278. The power supply 240 powers the central processor 220, the radio subsystem 250 and a display driver 230 (which may be contact- or inductive-sensitive). The power supply 240 may correspond to a direct current source (e.g., a battery pack, including rechargeable) or an alternating current (AC) source. The power supply 240 powers the various components through a power line (or bus) 279.

The central processor 220 communicates with applications executing within the mobile computing device 110 through the operating system 220a. In addition, intermediary components, for example, a window manager module 222 and a screen manager module 226, provide additional communication channels between the central processor 220 and operating system 220 and system components, for example, the display driver 230.

In one embodiment, the window manager module 222 comprises a software (e.g., integrated with the operating system) or firmware (lower level code that resides is a specific memory for that code and for interfacing with specific hardware, e.g., the processor 220). The window manager module 222 is configured to initialize a virtual display space, which may be stored in the RAM 216 and/or the flash memory 214. The virtual display space includes one or more applications currently being executed by a user and the current status of the executed applications. The window manager module 222 receives requests, from user input or from software or firmware processes, to show a window and determines the initial position of the requested window. Additionally, the window manager module 222 receives commands or instructions to modify a window, such as resizing the window, moving the window or any other command altering the appearance or position of the window, and modifies the window accordingly.

The screen manager module 226 comprises a software (e.g., integrated with the operating system) or firmware. The screen manager module 226 is configured to manage content that will be displayed on the screen 130. In one embodiment, the screen manager module 226 monitors and controls the physical location of data displayed on the screen 130 and which data is displayed on the screen 130. The screen manager module 226 alters or updates the location of data as viewed on the screen 130. The alteration or update is responsive to input from the central processor 220 and display driver 230, which modifies appearances displayed on the screen 130. In one embodiment, the screen manager 226 also is configured to monitor and control screen brightness. In addition, the screen manager 226 is configured to transmit control signals to the central processor 220 to modify power usage of the screen 130.

A browser predictive caching module 228 comprises software that is, for example, integrated with the operating system 220a or configured to be an application operational with the operating system 220a. In some embodiments it may comprise firmware, for example, stored in the flash memory 214. The browser predictive caching module 228 is configured to pre-cache (or precache) addresses (or web pages, or remote data servers) based on usage information in order to predict (or anticipate) when the user will wish to view certain web pages.

It is noted that in one embodiment, central processor 220 executes logic (e.g., by way of programming, code, or instructions) corresponding to executing applications interfaced through, for example, the navigation area 140 or switches 170. It is noted that numerous other components and variations are possible to the hardware architecture of the computing device 200, thus an embodiment such as shown by FIG. 2 is just illustrative of one implementation for an embodiment.

The radio subsystem 250 includes a radio processor 260, a radio memory 262, and a transceiver 264. The transceiver 264 may be two separate components for transmitting and receiving signals or a single component for both transmitting and receiving signals. In either instance, it is referenced as a transceiver 264. The receiver portion of the transceiver 264 communicatively couples with a radio signal input of the device 110, e.g., an antenna, where communication signals are received from an established call (e.g., a connected or on-going call). The received communication signals include voice (or other sound signals) received from the call and processed by the radio processor 260 for output through the speaker 120 (or 184). The transmitter portion of the transceiver 264 communicatively couples a radio signal output of the device 110, e.g., the antenna, where communication signals are transmitted to an established (e.g., a connected (or coupled) or active) call. The communication signals for transmission include voice, e.g., received through the microphone 160 of the device 110, (or other sound signals) that is processed by the radio processor 260 for transmission through the transmitter of the transceiver 264 to the established call.

In one embodiment, communications using the described radio communications may be over a voice or data network. Examples of voice networks include Global System of Mobile (GSM) communication system, a Code Division, Multiple Access (CDMA system), and a Universal Mobile Telecommunications System (UMTS). Examples of data networks include General Packet Radio Service (GPRS), third-generation (3G) mobile (or greater), Long Term Evolution (LTE), High Speed Download Packet Access (HSDPA), High Speed Uplink Packet Access (HSUPA), and Worldwide Interoperability for Microwave Access (WiMAX).

While other components may be provided with the radio subsystem 250, the basic components shown provide the ability for the mobile computing device to perform radio-frequency communications, including telephonic communications. In an embodiment, many, if not all, of the components under the control of the central processor 220 are not required by the radio subsystem 250 when a telephone call is established, e.g., connected or ongoing. The radio processor 260 may communicate with central processor 220 using the data line (or bus) 278.

The card interface 224 is adapted to communicate, wirelessly or wired, with external accessories (or peripherals), for example, media cards inserted into the expansion slot (not shown). The card interface 224 transmits data and/or instructions between the central processor and an accessory, e.g., an expansion card or media card, coupled within the expansion slot. The card interface 224 also transmits control signals from the central processor 220 to the expansion slot to configure the accessory. It is noted that the card interface 224 is described with respect to an expansion card or media card; it also may be structurally configured to couple with other types of external devices for the device 110, for example, an inductive charging station for the power supply 240 or a printing device.

Browser Precaching Module

Figure 3:
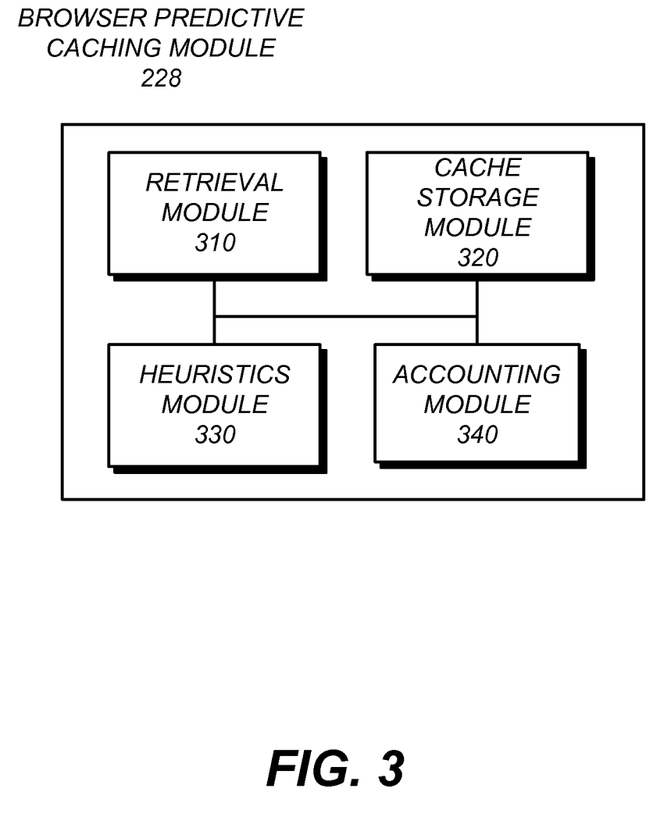
FIG. 3 illustrates one example embodiment of an architecture for browser predictive caching.

FIG. 3 illustrates one embodiment of a logical view of the browser predictive caching module 228. As previously noted, the browser predictive caching module 228 is configured to pre-cache addresses based on request patterns and contextual information in order to predict (or anticipate) when the mobile computing device 110 will be used to access (e.g., view) certain web pages or remote servers. For the purpose of this document, pre-caching an address (an action) is synonymous with pre-caching the content of an address, and refers to the action of downloading and caching the content at the address of interest in advance of the user requesting the content. In contrast, a pre-cache address (a subject) refers to the address whose content will be scheduled for pre-caching and not the content itself. In one embodiment, the browser predictive caching module 228 comprises a retrieval module 310, a cache storage module 320, a heuristics module 330, and an accounting module 340, which are communicatively coupled with each other.

The retrieval module 310 is configured to receive the address of the remote content and to use that address in order to retrieve that content. Content retrieval can take several forms. For example, a user may use a web browser on the mobile computing device to request the loading of a web page. The web page is located at a particular web or network address (e.g., a universal resource locator (URL)) or identifier (e.g., a universal resource identifier (URI)). The user makes the content request by providing the web browser the address of the requested web page. Alternatively, applets on the mobile computing device 110 can make requests for content located remotely over the network. The address of the remote content is known by the applet. The user requests the content through normal use of the applet, and is not required to know the address of where the content that provides the functionality of the applet is located. Applet as used herein refers to any type of application installed on or dynamically downloaded for execution on a mobile device, including for example webpage scripts, web applications, or stand alone applications. This may include, but is not limited to, java applets.

In one embodiment, how the retrieval module 310 retrieves the content at the requested address depends upon whether the requested address has been cached by the browser predictive caching module 228, and whether the cached content is still timely and relevant. If the content at the address is not cached, or if the content is either no longer timely or relevant, then the retrieval module 310 downloads the content from an external source based on the provided address. In one embodiment, the retrieval module 310 communicates with the central processor 220 and operating system 220a in order to retrieve the content externally. In this embodiment, the central processor 220 and operating system 220a make use of the short range radio 218, or the radio subsystem 250 to retrieve the content. In another embodiment, the retrieval module 310 is configured to retrieve content associated with an address.

The cache storage module 320 manages a request database, a data cache, and a list of pre-cache addresses. The request database is configured to store records of requests. A request is comprised of the requested addresses (both pre-cached and not) and the timestamp of the request. Each request record also stores statistical and contextual information about the request. The data cache stores pre-cached content from pre-cache addresses. The list of pre-cache addresses comprises a list of all addresses that have been accessed with sufficient frequency to be scheduled for pre-caching in the cache storage module 320. The determination of which addresses to pre-cache (add to the list of pre-cache addresses) is made by both the heuristics module 330 and the accounting module 340. In one embodiment, the cache storage module 320 communicates with the flash memory 214 or RAM 216 to store the addresses and any pre-cached data. In another embodiment, the cache storage module 320 is configured to store the addresses and associated pre-cached data. In one embodiment, the request database is implemented as an internal data structure within the cache storage module 320. In another embodiment, the request database is implemented as an external database module stored on disk, or on a remote server.

As stated above, the cache storage module 320 is also configured to store usage statistics associated with the address requests. The usage statistics comprise an access count CA of how many times each address request has been made in recent history. The count is initialized to one every time a new address is accessed that has not been requested before. The usage statistics may optionally further comprise access timestamps of the time of each access to the same address. The access timestamps provide information about time of day, week, month, and year of each access. Additionally, each time the address is accessed, an optional time of last access is updated to reflect the timestamp of the current access TC. In one embodiment all access timestamps are stored indefinitely. In other embodiments, access timestamps are cleared with a predetermined frequency, or based on the frequency of access to each address. If the address has content pre-cached in the cache storage module 320, the usage statistics additionally comprise a download timestamp TL representing the timestamp when the pre-cached content was downloaded to the cache storage module 320. An example of a usage statistics record could be structured as follows:

```
class RequestStats {
    URL address;         // Requested address.
    Data cachedData;     // Latest copy of cached data
from address.
```

-continued

```
        Container<Request> requests;    // List of last N requests.
        Container<Hourly> hourly;       // Hourly patterns found.
        Container<Daily> daily;         // Daily patterns found.
        Container<Weekly> weekly;       // Weekly patterns found.
    }
    class Request {
        Time requestTime;               // Time of request.
        int timeliness;                 // Heuristic timeliness value.
        int accessCount;
    }
    class Hourly {
        int minuteOfHour;               // Minute of the hour when request
manifests.
        Time expirationTime;            // Time in future when this pattern
expires.
    }
    class Daily {
        int minuteOfDay;                // Time of the day when request
                                        manifests.
        Time expirationTime;            // Time in future when this pattern
expires.
    }
    class Weekly {
        int minuteOfWeek;               // Time of the week when request
                                        manifests.
        Time expirationTime;            // Time in future when this pattern
expires.
    }
```

The usage statistics for pre-cache addresses additionally comprise a pre-cache schedule. The pre-cache schedule indicates the periodicity and/or time of day when the cache of the content from a given address should be updated with a download of the current content into the cache storage module 320. For example, the pre-cache schedule for a web page may indicate that the web page should be loaded every Sunday morning at 7:30 AM. The pre-cache schedule for an address is determined as a function of the current time $T_C$ of access when the pre-cache schedule was first created, a heuristic timeliness value $T_H$, and the usage statistics. For example, the pre-cache schedule may be based on the pattern of access timestamp data describing when the address is requested within a predetermined period, which is drawn from the usage statistics. The predetermined period may be any or all of sub-hourly, hourly, daily, weekly, monthly, yearly, or any period in between, or a combination of one or more thereof. An example pre-cache schedule record could be as follows:

```
        class PreCacheSchedule {
            RequestStats stats;
            Time nextLoadTime;
            int repeatInterval;
        }
```

In some embodiments, the usage statistics of the cache storage module 320 additionally comprise contextual information such as power and network availability data as a function of time. For example, the usage statistics may additionally comprise keeping track of when the mobile computing device 110 is attached to a power supply, and when it is running on battery power. In another example, the usage statistics comprise information about when the mobile computing device 110 has network access, including for example, WiFi, 3G or 4G access, extended or roaming access, or no network access at all. This information increases the capability of the disclosed embodiments to predict and to opportunistically schedule when to download content of pre-cache addresses in anticipation of a load request. Thus, the pre-cache schedule may be based on contextual information such as power and network availability.

In other embodiments, the contextual information additionally comprises the geo-location of the device (determined by a GPS or analogous mechanisms), and/or the identity of the connected network at the time the addresses are accessed. This information can be used to improve the heuristics module's 330 ability to predict when the user would request the loading of an address. For example, certain addresses may be accessed by the user at certain times of the day but only when the user is in the office or at home (or further when connected to their office or home WiFi access point). In contrast, when the same user is in the process of travelling, he may not access those addresses. This pattern can be detected by correlating the request of addresses with the geo-location of the device or the identity of the network at the time of the request. In another example, time-based address content alone may indicate a strong user preference for loading content from a particular address at 3:00 PM almost every day. Contextual information may further indicate that the particular address is loaded at 3:00 PM on days when the user is located in the office at 3 pm each day, but not when the user is located anywhere else. The pre-cache schedule could then be optimized to pre-cache the particular address each day near 3:00 PM, only under the condition that the user is located in their office near the time of precaching.

The heuristics module 330 is configured to populate the pre-cache schedule of a pre-cache address. The heuristics module 330 analyzes the usage statistics of the cache storage module 320 in order to make its determinations. The heuristics module 330 determines if there are any correlations in the contextual data or in the periodicity of the time of access for each address. Periodicity may be examined over any period. For example, the heuristics module 330 may determine if there is a hourly pattern of loading a particular web page at a particular minute of the hour. In another example, the periodicity may be on a daily, weekly, monthly, or yearly basis. If a pattern is determined (or identified), and if the address has been accessed a sufficient number of times, the heuristics module 330 adds an entry to the pre-cache schedule that the content of the address in question should be downloaded at a specific amount of time before a request to load the address is expected. This specific amount of time is called the heuristic timeliness value $T_H$. The heuristic timeliness value $T_H$ is used to schedule a pre-caching event prior to the expected time of a load request to, at least in part, give the retrieval module 310 time to pre-cache current copy of the content located at the address near to the time when a request is expected to load the content. In one embodiment, the heuristics module uses a fixed timeliness value rather than a heuristic timeliness value. For example, the following illustrates how the heuristic module 330 detects an hourly pattern and applies the heuristic timeliness value in determining when to pre-cache the data of a requested address:

```
    function Heuristic.detectHourlyPattern(request, stats,
currRequestTime) {
            Container<Request> previousRequests = stats.requests;
            Container<Hourly> patterns = stats.hourly;
            // Scan the list of previous requests for hourly matches for the
            // current request time subject to the current request's
            // heuristic timeliness allowance.
            h = CheckIfHourPatternExists(currRequestTime,
            previousRequests,
                                    request.timeliness);
            // If a pattern is found, then add it to the list of hourly
            // patterns.
            if (h.Exists( )) {
                // Set patterns parameters.
                h.minuteOfHour =
```

-continued

```
            computeMinuteOfHour(currRequestTime);
            h.expirationTime = currRequestTime +
                        (EXPIRATION_ALLOWANCE *
                        MINUTES_IN_HOUR);
            // Add the pattern.
            patterns.add(h);
            // Schedule the pre-caching of this request for the next hour,
            // but do it just a little before the request time based on
            // the heuristic timeliness value.
            nextPreCacheTime = currentRequestTime
                        + MINUTES_IN_HOUR
                        − request.timeliness;
            Scheduler.add(request, h, nextPreCacheTime);
      }
}
```

In different embodiments, the heuristic timeliness value may be determined by incremental adjustments applied on an initial value, where the adjustments are computed based on the differences in the time of a present request relative to times of previous requests. Additionally, the heuristic timeliness value may be computed using one or more statistical processes applied to recorded request times and other contextual data related to the request.

The heuristic timeliness value $T_H$ also represents an amount of time that the pre-cached content is expected to be valid. For example, a short heuristic timeliness value $T_H$ indicates that the content located at the pre-cache address is expected to have a short shelf life, and that updates will be expected by a user with high frequency. A long heuristic timeliness value $T_H$ indicates that the content does not update very quickly. In an effort to minimize network and power load on the mobile computing device 110, the retrieval module 310 can take advantage of different heuristic timeliness values to load web pages in advance, when power is available or when network bandwidth is higher. An address with a high heuristic timeliness value $T_H$ provides a great deal of flexibility to the retrieval module as to when to pre-cache the relevant address content in contrast with an address with a low heuristic timeliness value $T_H$. One example of an address which might be expected to have a high heuristic timeliness value $T_H$ is a weather site, because weather may change on a relatively slow timescale (e.g., daily or twice daily (e.g., morning and evening)). One example of an address which might be expected to have a low heuristic timeliness value $T_H$ is a sports site, because during a sports game updates might be asked for on short notice, even within a short time period (e.g., every few minutes).

Once initially established, the pre-cache schedule and heuristic timeliness value $T_H$ can be altered by a number of different factors. In one embodiment, the accounting module 340 performs a periodic maintenance, during which the heuristic timeliness value $T_H$ is re-determined using new usage statistic data. In another embodiment, the pre-cache schedule and the heuristic timeliness value $T_H$ can be updated on after each address request. Updating after each address request is also referred to as rebalancing, and comprises a process of minutely adjusting the $T_H$ and/or the pre-cache schedule each time new data is received. Other embodiments may adjust $T_H$ and the pre-cache schedule at some intermediate interval, based on more than access request, but without waiting for periodic maintenance. Each of the above embodiments has different advantages. Waiting longer to collect more address access requests provides more data which can be analyzed in a more robust manner to provide the most accurate values for $T_H$ and the pre-cache schedule, at the expense of a delay between each update. Updating "on the fly" (or real-time) with each request is more responsive, but requires processing after each instance which could contend for device resources that is needed for user activity at that instant. For example, the following illustrates how the scheduled request times and heuristic timeliness value are adjusted in reaction to a present request time in correlation with previously collected request statistics:

```
      function Heuristic.process(stats, requestTime) {
            Request r = Heuristic.processRequestTimes(stats, requestTime);
            Heuristic.processHourly(r, stats, requestTime);
            Heuristic.processDaily(r, stats, requestTime);
            Heuristic.processWeekly(r, stats, requestTime);
      }
      function Heuristic.processRequestTimes(stats, currRequestTime) {
            Container<Request> previousRequests = stats.requests;
            // Find the previous request that matches the current request based
            // on their time of request subject to the tolerance specified by
            // the previous request's heuristic timeliness value.
            Request r = previousRequests.findMatch(currRequestTime);
            if (r.isNotFound( )) {
                  // If a match was not found, then create a new request record with
                  // an allowance of the max heuristic timeliness value.
                  r = new Request(currRequestTime, MAX_TIMELINESS);
                  // Add the new request to the list of previous requests.
                  previousRequests.add(r);
            } else {
                  // If a match was found in recent history, then the user may have
                  // been remaking the request more frequently than our timeliness
                  // value expects. Refine the timeliness value accordingly.
                  Heuristic.refineTimeliness(request, currRequestTime);
            }
            // Return the found request to be further processed.
            return r;
      }
      function Heuristic.processHourly(request, stats, currRequestTime) {
            Container<Hourly> patterns = stats.hourly;
      // Compute the minute or the hour when this request supposedly happens.
            int minuteOfHour = computeMinuteOfHour(currRequestTime);
      // Check if there are previously identified hourly patterns for this
      // request based on the minute of the hour and the present timeliness
      // value allowed for the request.
            Hourly h = patterns.findMatch(minuteOfHour,
                        request.timeliness);
      // If a match is found, then we need to make a few adjustments to the
      // pattern to adapt to the user's new usage pattern.
            if (h.isFound( )) {
                  Heuristic.updateHourlyPattern(request, currRequestTime);
      // Else, if a match is NOT found, then check if the current request
      // forms a new hourly pattern and record it if needed.
            } else {
                  Heuristic.detectHourlyPattern(request, stats,
                        currRequestTime);
            }
      }
      function Heuristic.updateHourlyPattern(request, currRequestTime) {
      // Compute the difference in the request times. If the request times
      // differ, then it may be a sign that the user may be more relaxed
      // about the timeliness of the request. Increase the timeliness
      // allowance according.
      //
      // If this assumption is not true, the user will request an update
      // quickly which will trigger an adjustment back in the other direction
      // (done in Heuristic.refineTimeliness( ) below).
            diff = abs(minuteOfHour − h.minuteOfHour);
            request.timeliness = max(request.timeliness + diff,
                                    MAX_TIMELINESS);
      // Also, the user may be making this same request a bit earlier or a
      // bit later in the hour. Follow the user's latest behavior.
            h.minuteOfHour = minuteOfHour;
      // Finally, if we get this request, then it indicates that this
      // request pattern is still true. Renew the lease of the pattern
      // so that it expires later.
```

```
        h.expirationTime = currRequestTime +
                (EXPIRATION_ALLOWANCE *
                MINUTES_IN_HOUR);
    }
```

In another embodiment, the heuristic timeliness value $T_H$ can be updated if a refresh request is received within a predetermined period after the cached version of the address is loaded, indicating that the user believes the cached content to be out of date. In this instance, a refresh time difference is determined by subtracting the time of the refresh request $T_R$ from the time the cached version of the address was last requested and rendered $T_C$. The refresh time difference is then used by the heuristics module 330 to update the heuristic timeliness value $T_H$ to account for this refreshing action. For example, the following illustrates the reduction of the heuristic timeliness value in reaction to more frequent update requests by the user:

```
    function Heuristic.refineTimeliness(request, currRequestTime) {
        // A match was found in recent history, then the user may have
        // been remaking the request more frequently than our timeliness
        // value expects. Shrink the timeliness value accordingly:
        // Compute the difference in request times.
        diff = abs(currRequestTime - request.requestTime);
        // Set the new timeliness value to the minimum of:
        // 1. the adjusted timeliness value.
        // 2. the MINIMUM allowed timeliness value.
        request.timeliness = min(request.timeliness - diff,
MIN_TIMELINESS);
        // Update the access count value.
        request.accessCount = request.accessCount + 1;
    }
```

Variance between the heuristic timeliness value $T_H$ and the time when the load request occurs indicates that the heuristic timeliness value $T_H$ may be incorrect. In one embodiment, if the heuristic timeliness value scheduled in the pre-cache schedule expires without a request to load that address, then no action is taken. In this case, if a request occurs after the heuristic timeliness value $T_H$ has expired, the content from the requested address is re-downloaded by the retrieval module 310, and the cache storage module 320 replaces the existing version of the content with the current version. The heuristic timeliness value is then updated based on the difference between the time of the expiration of the heuristic timeliness value $T_H$ and the time of the load request. In one embodiment, the user can manually adjust the pre-cache schedule.

The accounting module 340 is configured to determine which addresses should be pre-cached. In one embodiment, those addresses where the access count $C_A$ exceeds (or alternately meets or exceeds) a count threshold $C_T$ are eligible for pre-caching. The access count $C_A$ increases in a dynamic manner depending upon when address requests are received from the user. As a result, the access count $C_A$ may exceed the count threshold $C_T$ at any time. Once the count threshold $C_T$ has been exceeded, the address is added to the list of pre-cache addresses (addresses to be scheduled for pre-caching). Different embodiments may determine the pre-cache schedule for the address at different times after the count threshold $C_T$ has been exceeded. In one embodiment, immediately after the count threshold $C_T$ has been exceeded, the accounting module 340 communicates with the heuristic module 330 to determine a pre-cache schedule and a heuristic timeliness value $T_H$ for when the address should be pre-cached. Depending upon the pre-cache schedule and the heuristic timeliness value $T_H$, the pre-caching may be immediate or delayed. In another embodiment, any pre-caching schedule determination is delayed until the accounting module 340 performs its periodic maintenance of the list of pre-cache addresses.

The accounting module 340 is further configured to perform periodic maintenance on the list of pre-cache addresses. The maintenance is performed to clean (or clear) from the list of pre-cache addresses those addresses where the access count $C_A$ has exceeded the count threshold $C_T$, but where there have been no recent requests to load that address. This keeps the size of the cache storage module 320 within a predetermined size (e.g., based on quantity, size of memory, or percentage of memory) while still pre-caching the addresses that are most relevant to the user. In one embodiment, the accounting module 340 performs the maintenance by periodically adjusting (e.g., decaying) the access count $C_A$ for all known addresses in the cache storage module 320, and then removing from the list of pre-cache addresses those addresses that no longer have an access count $C_A$ higher than the count threshold $C_T$.

The accounting module 340 maintenance period can be any one of sub-hourly, hourly, daily, weekly, biweekly, monthly, yearly, or any designated period, or a combination of one or more thereof. In one embodiment, the accounting module 340 may perform maintenance dynamically and incrementally with each address load request. In another embodiment, the parameters of the accounting module 340 can be adjusted by the user. The adjustable parameters of the accounting module 340 may comprise the count threshold $C_T$, the periodicity of the maintenance, as well as the amount the count decays each maintenance period.

Different embodiments may perform the maintenance process in different ways. In one embodiment, during maintenance, the accounting module 340 clears the list of pre-cached addresses. The accounting module 340 then decays the access count $C_A$ for all known addresses by a decay amount. After the decay, all addresses where the access count $C_A$ still exceeds the count threshold $C_T$ are then re-added to the list of pre-cache addresses. In another embodiment, the decay occurs first, and only those addresses whose access count $C_A$ falls below the count threshold $C_T$ are removed from the pre-cache address list. In another embodiment, the decay is not fixed and applied uniformly to all known addresses, rather the decay amount is a function of how long it has been since a request to load that address has been received, or alternatively how long the address has been pre-cached by the browser precaching module.

The accounting module 340 is additionally configured to communicate with the heuristics module 330 during the periodic maintenance to adjust the pre-cache schedule and heuristic timeliness value $T_H$ of all addresses in the list of pre-cache addresses. By analyzing the usage statistics from the period since the last maintenance, the pre-cache schedule and the heuristic timeliness value $T_H$ are updated to take into account new usage statistics and contextual information about address requests.

Browser Predictive Caching Operation

Figure 4:
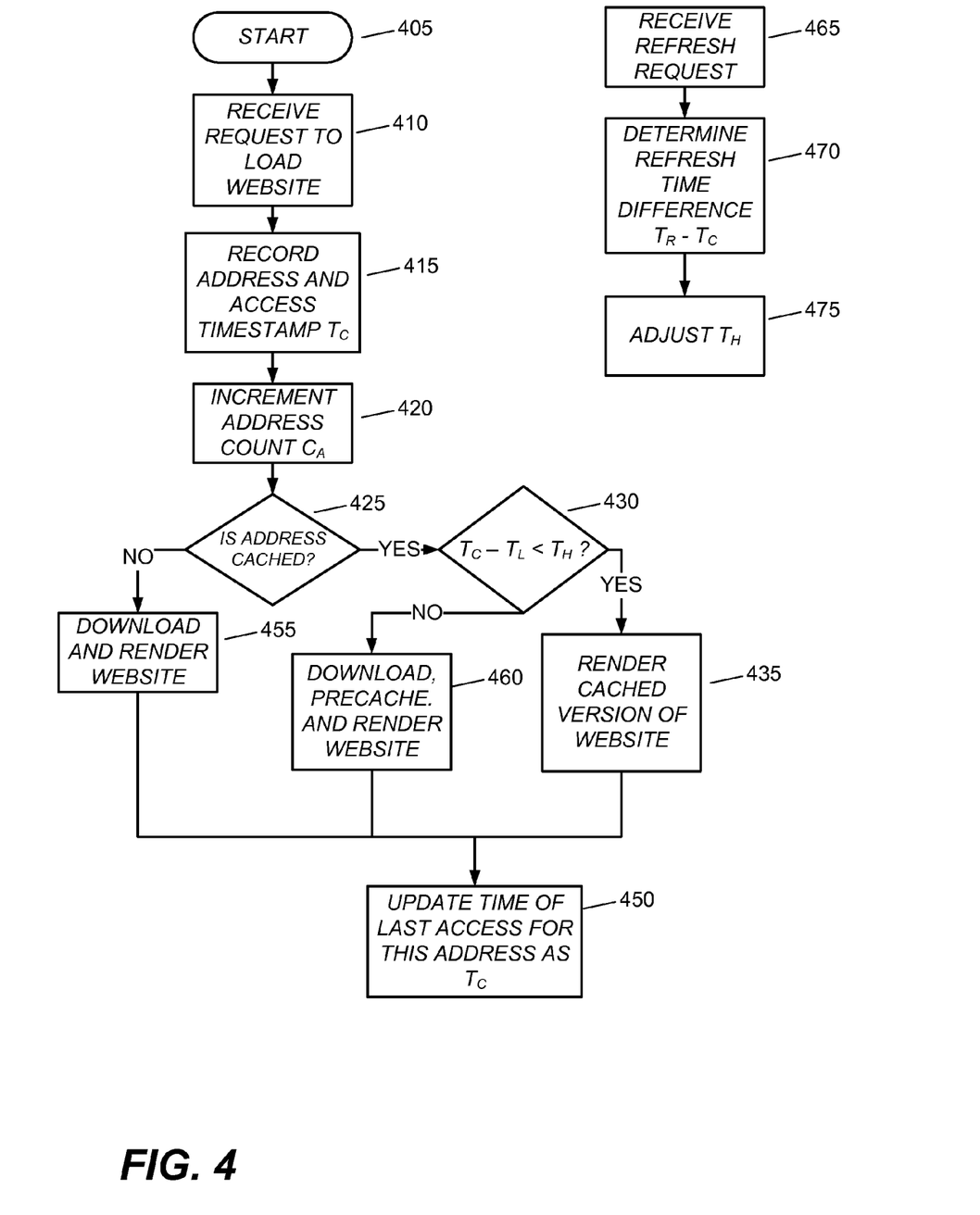
FIG. 4 illustrates one example embodiment of a process for browser predictive caching.

FIG. 4 illustrates one embodiment of a process for browser predictive caching. The process starts 405 by receiving 410 a request to load a web page located at an address. The process records 415 the address and the timestamp of the current request $T_C$ in a request record. If the request record already exists (i.e., this address has been loaded previously at this approximate time), then the process increments 420 the access count $C_A$ in the request record. If the request record does not already exist (i.e., the address has not been loaded previously), then the process creates a new request record for this address and timestamp, sets the access count in the newly created request record to an appropriate initial value, e.g., zero or one. The process then determines 425 if the requested address content has already been pre-cached (previously downloaded and is present in the data cache).

Responsive to determining that the requested address has already been pre-cached, the process compares 430 the downloaded timestamp $T_L$ against the current time $T_C$. If the difference between the downloaded timestamp $T_L$ and the request timestamp $T_C$ is less than a heuristic timeliness value $T_H$ for that address, the process renders 435 the cached version of the address content to the screen. If it has been determined that the requested address content has not been pre-cached, the process downloads 455 and provides for display (or renders) the content of the web page at the address. Alternatively, if the difference between the downloaded timestamp $T_L$ and the request timestamp $T_C$ exceeds a heuristic timeliness value $T_H$ for the address, the address content at the current address is downloaded 460, re-cached, and rendered. The downloaded timestamp of the cached address content is also updated to reflect the time that this copy of the content was downloaded. Finally, regardless of whether the address was pre-cached or not, the time of last access for this address is updated to be the current request timestamp $T_C$.

In the event a request to refresh the accessed web page is received 465 while the web page is being displayed, the process determines 470 a refresh time difference between the time of the refresh request $T_R$ and the time the web page was last requested and rendered $T_C$. In one embodiment, the heuristic timeliness value $T_H$ is then adjusted 475 as a function of the refresh time difference.

Figure 5:
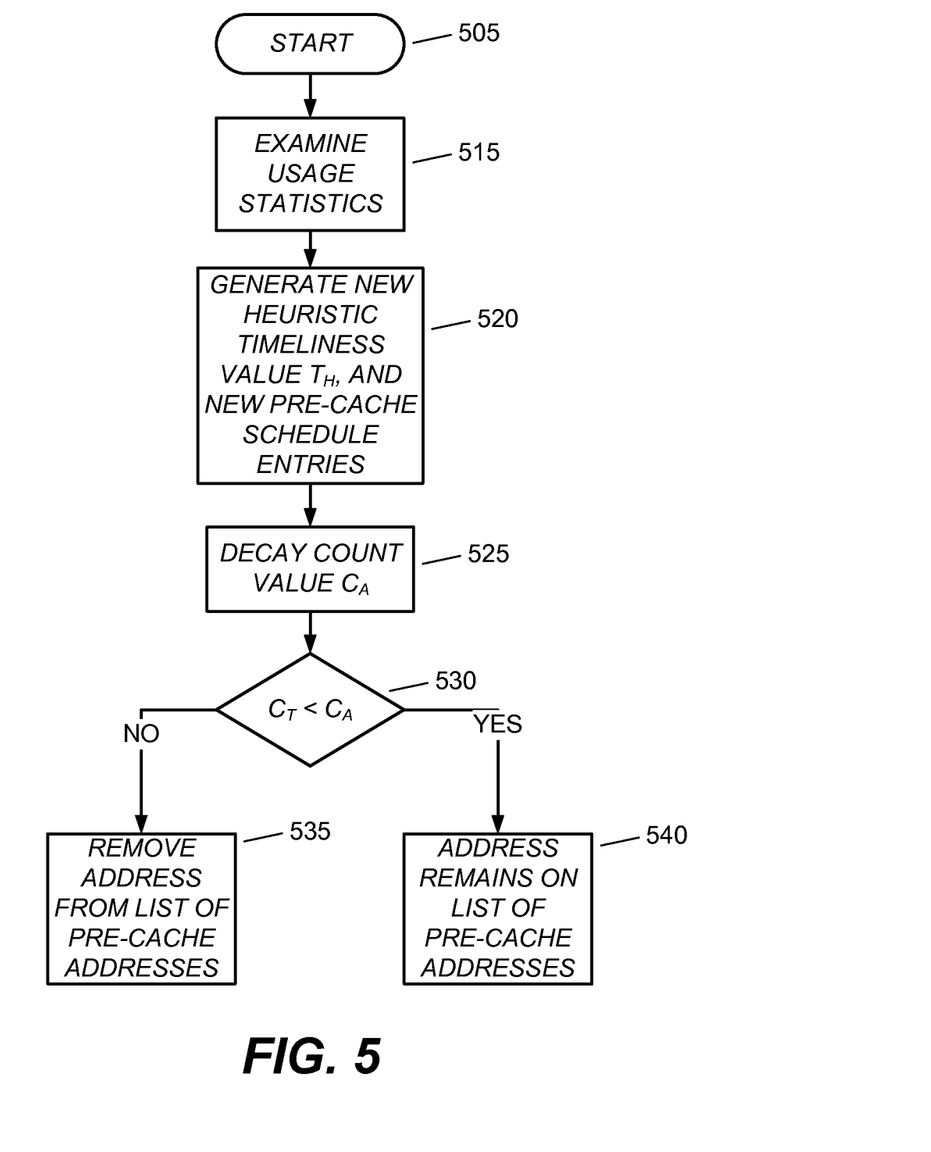
FIG. 5 illustrates one example embodiment of a process for performing maintenance on the browser cache.

FIG. 5 illustrates another embodiment of a process for browser predictive caching. In this embodiment, a periodic process cleans (or clears) the browser cache of addresses that no longer meet the criteria for pre-caching. The process starts 505 by examining 515 the usage statistics and contextual information for each address that has been accessed since the last cache cleaning. The examination further comprises checking for correlations in the periodicity of the time of access for addresses, correlations between time of access and frequency of refresh requests for addresses, and correlations between address access requests and usage contextual information. Based on the examination, the process then generates 520 new heuristic timeliness values $T_H$ and pre-cache schedule entries for each address that meets the criteria for pre-caching.

The process then decays 525 the access count of each accessed address as a function of an algorithm. Different embodiments may use different algorithms. For example, in one embodiment the algorithm comprises reducing or not reducing the recorded access count as a function of the difference in time from the last time the address was accessed. In another embodiment, the algorithm comprises reducing or not reducing the recorded access count as a function of the time when the address was first accessed. In another embodiment, the algorithm comprises reducing the count of all accessed web pages by a fixed number.

After the access counts are decayed, the process determines 530 whether the access count for a given address $C_A$ is lower than a predetermined access count threshold for pre-caching $C_T$. If the access count $C_A$ is less than the access count threshold $C_T$, then the address is removed 535 from the list of pre-cache addresses. If the access count $C_A$ is greater than the access count threshold $C_T$, then the address remains 540 on the list of pre-cache addresses. In an alternative embodiment, the list of pre-cache addresses is cleared during each cleaning, and only if the access count of a given address exceeds the access count threshold is the address re-added to the list of pre-cache addresses.

Browser Predictive Caching Webpage Access Example

Figure 6:
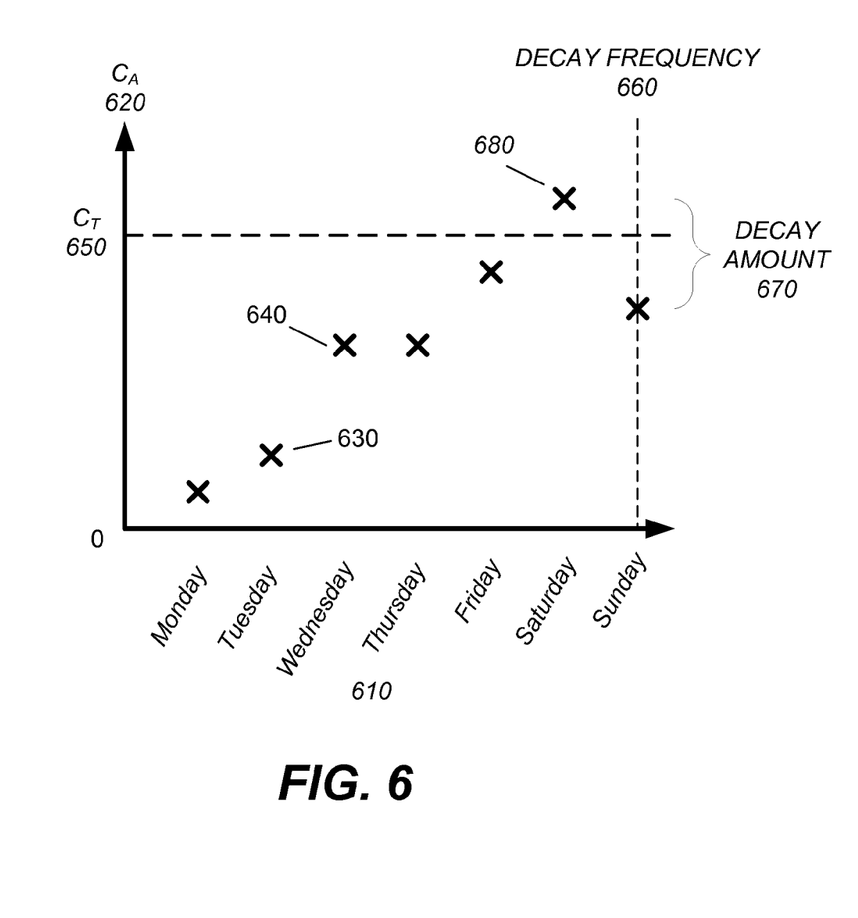
FIG. 6 illustrates one example embodiment of a graphical example of browser predictive caching and pre-caching decay as a function of the number of times a particular address is accessed.

FIG. 6 provides a graphical illustration of an example of tracking the requests to access a particular sample address, how the access count changes with each access, and how the disclosed embodiments maintain (or clear, clean or add to) the list of pre-cache addresses. The x-axis tracks the days of the week 610. As disclosed above, the browser predictive caching of the disclosed embodiments keeps track of address accesses using timestamps. Thus, days of the week 610 is just one example embodiment of a way to break down the usage statistics that are recorded in the cache storage module 320. The y-axis displays the access count $C_A$ for the sample address.

In the example of FIG. 6, the sample address is not pre-cached at the start of the week. This is evidenced by the fact that the access count $C_A$ is far below the access count threshold for precaching $C_T$. As the week progresses, requests to load the sample address are received, as the access count $C_A$ increases from Monday to Tuesday 630, and jumps significantly higher on Wednesday 640. By Saturday 680, the access count $C_A$ exceeds the pre-caching access count threshold $C_T$.

In the example of FIG. 6, the pre-cache maintenance is performed on a weekly basis 660, and so, on Sunday the list of pre-cache addresses is pruned. Here, the decay amount 670 brings the sample access count $C_A$ below the access count threshold $C_T$. As a result, in this sample embodiment the sample address will not be scheduled for pre-caching. In some embodiments, as soon as the access count exceeds the pre-caching access count threshold, the address will immediately be added to the list of pre-cache addresses and a pre-cache schedule is created 445 to determine when the address content should be pre-cached. Using FIG. 6 as an example, in these embodiments the sample address would have been added to the list of pre-cache addresses starting on Saturday 680, but would have been removed from the list again on Sunday 660. If the example of FIG. 6 were extended into the next week (not shown), it is likely that the sample address would be included in the list of pre-cache addresses at the end of the next week, assuming a similar request pattern for the sample address.

The disclosed embodiments beneficially allow for browser predictive caching that can anticipate when the user will require certain content, and download and pre-render it ahead of time in a timely manner just before the user requests it. This provides the user with a content browsing experience that is not delayed by content download and rendering time. This deals with the underlying network bandwidth bottleneck problem that causes slowness in retrieval of remote content, while still providing the most up to date version of content possible, based on the user's viewing habits of particular web pages.

Further, the disclosed embodiments minimize the effects of poor network bandwidth/speed on mobile computing devices while still providing users with up-to-date versions of requested content. Additionally, the disclosed embodiments have a low overhead, and continually adapt to recognized user browsing tendencies (or patterns) to tailor when the requested address content is obtained for the user. By offloading address content downloading to other times, the described embodiments can take advantage of the times when a mobile computing device has higher network bandwidth or wall based power to function at a higher level. This can also minimize the need to perform network access functions in periods of low network availability or low power availability.

Further, the disclosed embodiments are hardware agnostic. The disclosed embodiments do not require expensive network infrastructure upgrades or upgraded mobile computing device processors.

ADDITIONAL CONSIDERATIONS FOR BROWSER PREDICTIVE CACHING

Some portions of the above description describe the embodiments in terms of algorithms and symbolic representations of operations on information, for example, as illustrated and described with respect to FIGS. 3 and 4 and functionality described in FIGS. 5 and 6. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

In this description, the term "module" when used in the context of aspects of the mobile computing device 110 refers to units of computational logic for providing the specified functionality. A module can be implemented in hardware, firmware, and/or software. It will be understood that the named modules described herein represent one embodiment of the present invention, and other embodiments may include other modules. In addition, other embodiments may lack various modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of the mobile computing device 110, loaded into flash 214 or RAM 216 memory, and executed by the one or more central processors 220 of the mobile computing device 110.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for browser precaching of frequently requested addresses through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method for pre-caching web pages for display through a screen of a mobile device, the method comprising:
   receiving a load request comprising a current timestamp and an address, the address pointing to a remote server storing a current copy of an address content;
   determining that an existing copy of the address content is pre-cached on the mobile device;
   determining that a difference of the current timestamp and a pre-cache timestamp is greater than a heuristic timeliness value;
   pre-caching the current copy of the address content on the mobile device from the remote server at the address;
   providing the current copy of the address content for display on the screen;
   analyzing usage statistics comprising contextual information and timestamps of access requests to the address; and
   updating the heuristic timeliness value based on the usage statistics.

2. The method of claim 1, further comprising:
   determining that the heuristic timeliness value is greater than the difference of the current timestamp and the pre-cache timestamp; and
   providing the existing copy of the address content for display on the screen.

3. The method of claim 1, wherein the contextual information comprises at least one of geo-location data, power availability data, network identity, and network availability data.

4. The method of claim 1, further comprising:
   analyzing usage statistics comprising contextual information and timestamps of access requests to the address; and
   updating a pre-cache schedule based on the usage statistics.

5. The method of claim 4, wherein updating the pre-cache schedule based on the usage statistics comprises:
adding a new entry in the pre-cache schedule, the new entry comprising a new entry request time and a new entry heuristic timeliness value.

6. The method of claim 4, wherein the contextual information comprises at least one of geo-location data, power availability data, network identity, and network availability data.

7. A computer implemented method for pre-caching web pages for display through a screen, the method comprising:
receiving a load request comprising a current timestamp and an address;
incrementing an access count;
determining that the access count exceeds a caching threshold;
adding the address to a list of pre-cache addresses;
analyzing usage statistics comprising contextual information and timestamps of access requests to the address;
creating a pre-cache schedule based on the usage statistics;
decaying the access count for the address by a decay amount;
determining that the caching threshold exceeds the access count; and
removing the address from the list of pre-cache addresses.

8. The method of claim 7, wherein creating the pre-cache schedule based on the usage statistics comprises:
adding a new entry in the pre-cache schedule, the entry comprising a new entry request time and a new entry heuristic timeliness value.

9. The method of claim 7, wherein the contextual information comprises at least one of geo-location data, power availability data, network identity, and network availability data.

10. A non-transitory computer readable storage medium configured to store instructions, the instructions when executed by a processor cause the processor to:
receive a load request comprising a current timestamp and an address, the address pointing to a remote server storing a current copy of an address content;
determine that an existing copy of the address content is pre-cached on the mobile device;
determine that a difference of the current timestamp and a pre-cache timestamp is greater than a heuristic timeliness value;
pre-cache the current copy of the address content on the mobile device from the remote server at the address;
provide the current copy of the address content for display on the screen;
analyze usage statistics comprising contextual information and timestamps of access requests to the address; and
update a pre-cache schedule based on the usage statistics.

11. The non-transitory computer readable storage medium of claim 10, further comprising instructions that cause the processor to:
determine that the heuristic timeliness value is greater than the difference of the current timestamp and the pre-cache timestamp; and
provide the existing copy of the address content for display on the screen.

12. The non-transitory computer readable storage medium of claim 10, further comprising instructions that cause the processor to:
analyze usage statistics comprising contextual information and timestamps of access requests to the address; and
update the heuristic timeliness value based on the usage statistics.

13. The non-transitory computer readable storage medium of claim 12, wherein the contextual information comprises at least one of geo-location data, power availability data, network identity, and network availability data.

14. The non-transitory computer readable storage medium of claim 10, wherein updating the pre-cache schedule based on the usage statistics comprises:
adding a new entry in the pre-cache schedule, the entry comprising a new entry request time and a new entry heuristic timeliness value.

15. The non-transitory computer readable storage medium of claim 10, wherein the contextual information comprises at least one of geo-location data, power availability data, network identity, and network availability data.

* * * * *